July 18, 1961  R. W. LANDER  2,992,801
CLAMP
Filed Feb. 5, 1959

INVENTOR.
Richard W. Lander.
BY
Harness, Dickey & Pierce
ATTORNEYS.

United States Patent Office 2,992,801
Patented July 18, 1961

2,992,801
CLAMP
Richard W. Lander, Farmington, Mich., assignor to Clips & Clamps, Inc., Detroit, Mich.
Filed Feb. 5, 1959, Ser. No. 791,347
1 Claim. (Cl. 248—74)

My invention relates to clamps of the type normally used to hold conduits, cables and the like, in a desired position.

It is the principal object of my invention to provide a properly functioning clamp construction which may be manufactured much more inexpensively than similar clamp constructions of which I am aware.

My invention comprises the use of inexpensive, mild sheet steel in contrast to spring steel which is normally used in clamps of this nature. The clamp is a one-piece stamping that is rolled into a loop around the conduit being clamped into position. A tongue and slot in the stamping provide a lock to hold it in looped position.

My invention in its presently preferred form is shown in the accompanying drawings, in which.

Figure 1:
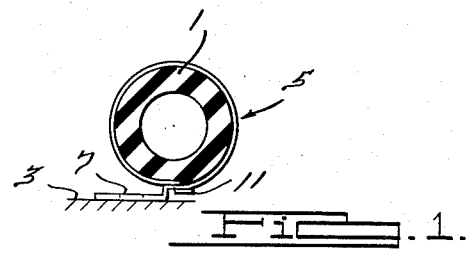
FIGURE 1 is a side view of the clamp in its operative clamping position and showing it holding a conduit or cable, the wall of which is shown in section.

Referring first to FIG. 1, a cylindrical hose 1 is shown attached to a surface 3 by means of a clamp 5 which is constructed in accordance with this invention. The clamp 5 has an attachment section or portion 7 at one end which is spot welded, screwed, or otherwise suitably fixed to the surface 3, an opening 9 being shown in the section 5 for the purpose of receiving a screw (not shown) to thread into the surface 3. The other end of the clamp 5 comprises a latch portion 11 which is a tongue of less width than the body portion 13 of the clamp.

Figure 2:
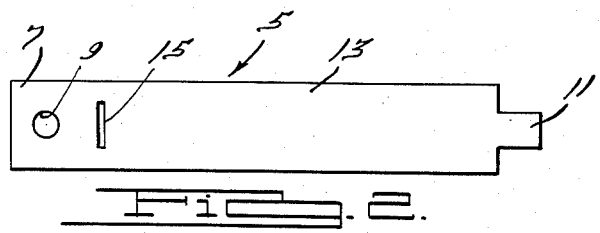
FIG. 2 is a plan view of the clamp in its blank form.

As can be seen in FIG. 2, the clamp 5 can be blanked out of a thin strip of mild steel strip and provided also with a transverse slot 15 in addition to the structural features that have already been mentioned. The opposite ends of the strip from which the clamp is formed are offset in the same direction. Thus, the attachment end 7 is offset at 17 and the tongue 11 is offset at 19. The offset 17 is slightly longer than the length of the tongue 11 beyond its offset 19.

Figure 4:
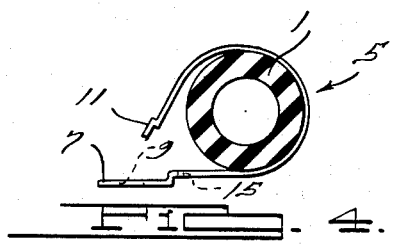
FIG. 4 is a view similar to FIG. 1 but shows the beginning stage of clamping wherein the stamping has been wrapped around the cable.
Figure 5:
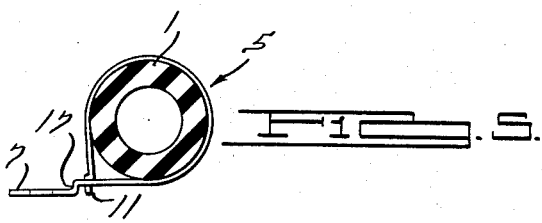
FIG. 5 is a view showing the next to last stage of clamping wherein the tongue has been inserted in the slot.
Figure 3:
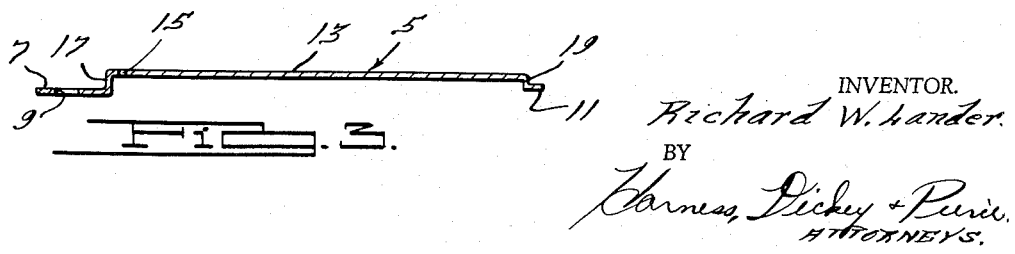
FIG. 3 is a longitudinal cross section along the length of the blank of FIG. 2 but shows it after the offsets have been formed in opposite ends.

In one method of use, the section 7 is first attached to the surface 3. The clamp 5 may be in the straight position shown in FIGS. 2 and 3 or it may be in a partially bent position. Since the metal forming the clamp is soft, it can be readily deformed and retains its deformed position, deforming plastically as distinguished from elastically. After the cable or conduit to be affixed to the surface 3 overlies the clamp 5, the end containing the tongue 11 is wrapped around the cable and the tongue 11 is projected through the slot 15, as shown in FIG. 5. In this position the end containing the tongue 11 is substantially tangent to the hose 1 and perpendicular to the surface 13. From this position the cable and the loop of clamp material is rotated bodily about the slot 15 so that the tongue 11 becomes parallel to the section 7, as can be seen in FIG. 1. In this position the cable is firmly and tightly locked and clamped in position. However, it can be unlocked by rolling it out in the opposite direction to that of attachment. Instead of first attaching section 7 to surface 3, the clamp can be rolled up and locked around the wire or cable before it is fixed to surface 3.

It is apparent that the invention may be embodied in constructions other than that illustrated herein.

I claim:

A clamp comprising a deformable strip having opposite ends offset in the same direction, means providing a slot in said strip between said offset ends, one of said ends comprising a tongue adapted to fit into said slot, the length of said tongue being less than the offset at the end of said clamp adjacent to said slot, said tongue and slot comprising a latch means for preventing disconnection of the tongue and clamp, said other end of the clamp providing means for attaching the clamp to a surface.

References Cited in the file of this patent

UNITED STATES PATENTS

| | | |
|---|---|---|
| 289,505 | Crooke | Dec. 4, 1883 |
| 337,019 | Schussler et al. | Mar. 2, 1886 |

FOREIGN PATENTS

| | | |
|---|---|---|
| 1,047,754 | France | of 1953 |